United States Patent Office 2,901,591
Patented Aug. 25, 1959

2,901,591

WELDING OF TWO PIECES, IN PARTICULAR IN THE PRODUCTION OF GAS CYLINDERS, AND VESSELS THUS OBTAINED

Pierre Tesson, Paris, France, assignor to Pecquet, Tesson & Cie, Crouy (Aisne), France, a French company No Drawing. Application December 16, 1955
Serial No. 553,404

Claims priority, application France December 20, 1954

3 Claims. (Cl. 219—137)

The present invention relates to the welding of two pieces, more particularly but not exclusively by electric welding using a flux and in any case by a deep penetration welding method, that is a method in which the metal sinks down. It is more particularly concerned with the welding of two pieces notably in the production of welded vessels and in particular gas cylinders, and the object of the invention is to provide improvements which are preferably used in combination, since in this way maximum advantage is obtained, but which may be used separately without departing from the scope of the invention.

In the deep penetration welding of two pieces of metal and in particular electric welding using a flux, it is usual to dispose, against the joint to be welded and on the opposite side to the electrode, a support or strip which is reached and held in place by the weld.

The subsequent removal of this support is usually difficult especially when, after the weld has been effected, this strip is disposed in the interior of a vessel which communicates with the exterior only through a small aperture. In this case it remains inside the vessel where its presence gives rise to a number of drawbacks, such as increase in weight, the fact that it is impossible to see and inspect the reverse side of the weld, etc. This is notably the case in the production of gas cylinders. In this type of production the body of the cylinder usually comprises two pressed-out elements which are in the form of bodies of revolution and are welded together in a transverse plane, or, alternatively, a tube and two welded ends. It is, furthermore, known to effect this welding by the method using a flux, and the support disposed in the region of the joint is in this case a steel strip which is in the form of a body of revolution and is disposed inside the vessel before welding.

It has also been proposed to use a strip in several pieces which may be taken apart after welding, or a block which is disposed inside the vessel in the region of the weld and is pressed against the two pieces to be welded, which are rotated about their axis of revolution, this axis corresponding to that of the vessel. These methods permit obtaining a weld which is visible and may be inspected inside the vessel after the strip has been removed, but they have the disadvantage of requiring a relatively large aperture for the purpose of removing the strip or block and this necessitates welding the body of a gas cylinder before the tap support base or end of the latter. The subsequent welding of the tap support base gives rise to serious difficulties.

The method of the invention is characterized in that the strip, or metal support, which is disposed in the region of the joint of the two pieces to be welded together by a deep-penetration weld, is of a material having a melting point lower than that of the material of which said two pieces are composed, and, after welding, said support is melted, for example by placing these two pieces in a furnace. In the case of a vessel, the liquid matter resulting from this melting is poured out of the vessel, however small the aperture through which the interior of the vessel communicates with the exterior. In this way, the support used for obtaining the weld does not remain permanently attached to the welded pieces, which eliminates the disadvantages usually due to its permanent presence.

In the production of gas cylinders, in particular, the method of the invention may also be used for joining the cylindrical elements forming the body of the cylinder as well as for fixing on one of these elements the central piece or base adapted to receive the tap, relief valve, etc. However, in the production of gas cylinders in accordance with the present invention, it is preferred to weld said base on the corresponding part of the body in the usual manner before welding together the elements of the body, so as to facilitate execution and inspection of the welding of the base. The aperture provided in the latter for mounting the tap is in fact amply sufficient for permitting pouring the molten metal out of the vessel when the strip used in the welding of the two pressed-out elements is melted. Thus, this method affords all the advantages of previously known methods with none of their respective disadvantages.

Preferably, the metal of the support is selected from those having the property of not being weldable to the metal of the pieces to be welded. This metal of the support is, for example, aluminum or an aluminum alloy.

Furthermore, in the case of vessels which are annealed after weldling, for example, gas cylinders, the melting of the support or strip is preferably effected in the course of the annealing operation, the metal of the strip being then so chosen that its melting point is lower than, or at the most equal to, the maximum annealing temperature for the vessel.

Preferably, moreover, the support strip has a shape which prevents its direct contact with the metal of the pieces facing the weld, so as to avoid its fusion in the course of welding.

Vessels obtained by the above-described method and in particular gas cylinders so produced, of course come within the scope of the invention.

What I claim is:

1. In a process of manufacture of substantially closed steel vessels of the class of gas cylinders, comprising butt-welding together by a deep penetration welding method the open ends of two tubular vessel sections, each provided with a bottom, the inside of the welded vessel thus provided communicating with the atmosphere only through a hole in the vessel wall and the diameter of said hole being much shorter than the length of the weld, and a weld backing strip having a length substantially equal to that of the weld being applied within the vessel along said open ends to be welded together, using as such weld backing strip a strip of a material not weldable to the vessel metal and having a melting point much lower than that of the latter but high enough to resist the welding heat, simultaneously melting said strip and annealing said welded vessel after the welding operation, the material of said strip being therefor so chosen as to have a melting point lower than the annealing temperature of said steel vessel, and pouring out through said hole the molten material of said strip upon said annealing operation terminated while said material is still in a liquid state.

2. In a process of manufacture of steel vessels of the class of gas cylinders as in claim 1, using as weld backing strip one made of aluminum.

3. In a process of manufacture of steel vessels of the class of gas cylinders as in claim 1, using as weld backing strip one made of aluminum alloy.

References Cited in the file of this patent

UNITED STATES PATENTS

| | | |
|---|---|---|
| 1,660,491 | Leeper | Feb. 28, 1928 |
| 1,679,702 | Wysong | Aug. 7, 1928 |
| 1,901,634 | Dawkins | Mar. 14, 1933 |
| 1,990,077 | Kershaw | Feb. 5, 1935 |
| 2,188,925 | Monay | Feb. 6, 1940 |
| 2,321,308 | Miller | June 8, 1943 |
| 2,802,092 | Hauck | Aug. 6, 1957 |